United States Patent
Crawford et al.

(10) Patent No.: US 7,607,043 B2
(45) Date of Patent: *Oct. 20, 2009

(54) ANALYSIS OF MUTUALLY EXCLUSIVE CONFLICTS AMONG REDUNDANT DEVICES

(75) Inventors: Timothy J. Crawford, Beaverton, OR (US); Michael R. Groseclose, Jr., Tucson, AZ (US); David A. Larson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 493 days.

This patent is subject to a terminal disclaimer.

(21) Appl. No.: 11/324,849

(22) Filed: Jan. 4, 2006

(65) Prior Publication Data

US 2007/0174663 A1  Jul. 26, 2007

(51) Int. Cl.
  *G06F 11/00* (2006.01)
(52) U.S. Cl. .............................. 714/22; 714/14; 714/25; 714/5
(58) Field of Classification Search .................. 714/5, 714/6, 7, 22, 48, 25, 26, 14
See application file for complete search history.

(56) References Cited

U.S. PATENT DOCUMENTS

| | | | | |
|---|---|---|---|---|
| 5,448,722 A * | 9/1995 | Lynne et al. | ................. | 706/49 |
| 5,568,491 A | 10/1996 | Beal et al. | | |
| 5,970,437 A * | 10/1999 | Gorman et al. | ............. | 702/184 |
| 6,012,152 A | 1/2000 | Douik et al. | | |
| 6,081,812 A * | 6/2000 | Boggs et al. | ................. | 707/202 |
| 6,385,665 B1 | 5/2002 | Canady et al. | | |
| 6,594,771 B1 * | 7/2003 | Koerber et al. | ............... | 713/330 |
| 6,636,981 B1 | 10/2003 | Barnett et al. | | |
| 2002/0010881 A1 | 1/2002 | White | | |
| 2002/0169794 A1 * | 11/2002 | Jones et al. | .................. | 707/204 |
| 2003/0111909 A1 * | 6/2003 | Liu et al. | ....................... | 307/64 |
| 2003/0161032 A1 * | 8/2003 | Amoruso | .................. | 359/341.1 |
| 2004/0221198 A1 | 11/2004 | Vecoven | | |
| 2004/0226561 A1 * | 11/2004 | Colla et al. | ............. | 128/204.21 |
| 2004/0255255 A1 * | 12/2004 | Singh | ............................. | 716/4 |
| 2006/0101304 A1 * | 5/2006 | Miura | ........................... | 714/5 |
| 2006/0168464 A1 * | 7/2006 | Yuasa | ......................... | 713/340 |
| 2006/0195751 A1 * | 8/2006 | Hess et al. | ................... | 714/746 |
| 2006/0208572 A1 * | 9/2006 | Zansky et al. | ................. | 307/66 |
| 2006/0265757 A1 * | 11/2006 | Endoh | ......................... | 726/26 |
| 2006/0271924 A1 * | 11/2006 | Calcaterra et al. | ........... | 717/168 |
| 2007/0043971 A1 * | 2/2007 | Suzuki | ........................ | 714/11 |

* cited by examiner

*Primary Examiner*—Scott T Baderman
*Assistant Examiner*—Chae Ko
(74) *Attorney, Agent, or Firm*—Quarles & Brady LLP

(57) ABSTRACT

A system for analyzing mutually exclusive conflicts among a plurality of redundant devices in a computer system includes a data management module operable on the computer system. The data management module parses through status data generated by the plurality of redundant devices to identify an error condition in one of the plurality of redundant devices, generate metadata describing the error condition, and take action to resolve the error condition. A method of analyzing mutually exclusive conflicts among redundant devices in a computer system includes collecting status data from the redundant devices, identifying an error condition, generating metadata describing the condition, analyzing the metadata to determine a lowest-level or least impacting redundant device that is the root cause of the condition, and taking an action to resolve the condition.

20 Claims, 2 Drawing Sheets

ANALYSIS OF MUTUALLY EXCLUSIVE CONFLICTS AMONG REDUNDANT DEVICES

BACKGROUND OF THE INVENTION

1. Field of the Invention

The present invention relates in general to computers, and, more particularly, to a system and method of fault checking in a hierarchical network of redundant devices.

2. Description of the Prior Art

As computer systems increasingly become more complex and interrelated in today's world, it is common to find computer systems which contain multiple components. Manufacturers, responding to customer demands of increased reliability and performance, are configuring computer systems with higher and higher degrees of associated redundancy. The redundancy can be obtained by providing multiple redundant devices, such as a plurality of batteries or a plurality of power supplies. If a first power supply fails, a second power supply can immediately step in to maintain the operation of the computer system.

Multiple redundant devices can be configured in a hierarchical fashion. In the case of batteries and power supplies, a plurality of batteries can be linked to a corresponding plurality of power supplies. The plurality of power supplies can then be linked to a corresponding plurality of power controller cards, in effect forming a hierarchical tree structure. A hierarchical network of redundant devices is designed to operate such that each component in the network works with every other component to ensure redundancy and performance in the overall computer system.

Inevitably, the purpose of configuring a hierarchical network of redundant devices is manifest as one device may fail to operate properly. Two mutually exclusive status conditions may be obtained, indicating an error somewhere in the network. Additionally, a second type of error condition known as a "can't happen" condition can be obtained. A variety of diagnostic methods are known in the art involving various testing procedures to determine which component of the network is not functional. Commonly, however, the diagnostic methods require an operator to take at least part of the computer system offline in order to run the appropriate testing procedures.

Thus, a need exists for a system for analyzing generated mutually exclusive conflicts in a hierarchical network of redundant devices that ensures the network remains online, operable, and usable. In addition, a need exists for a method of analysis and resolution of the mutually exclusive conflicts in a computer system, again under online conditions.

SUMMARY OF THE INVENTION

In one embodiment, the present invention is a system for analyzing mutually exclusive conflicts among a plurality of redundant devices in a computer system, comprising a data management module operable on the computer system, wherein the data management module parses through status data generated by the plurality of redundant devices to identify an error condition in one of the plurality of redundant devices, generates metadata describing the error condition, and takes action to resolve the error condition.

In another embodiment, the present invention is a method of analyzing mutually exclusive conflicts among redundant devices in a computer system, comprising collecting status data from the redundant devices, identifying an error condition, generating metadata describing the mutually exclusive condition, analyzing the metadata to determine a redundant device responsible for the error condition, and taking an action to resolve the error condition.

In still another embodiment, the present invention is a computer program product for analyzing mutually exclusive conflicts among a plurality of redundant devices, wherein the product is usable with a programmable computer processor having a computer readable program code embodied therein, comprising computer readable program code which collects status data from the redundant devices, computer readable program code which identifies an error condition, computer readable program code which generates metadata describing the error condition, computer readable program code which analyzes the metadata to determine a device among the plurality of redundant devices responsible for the condition, and computer readable program code which takes an action against the device to resolve the error condition.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
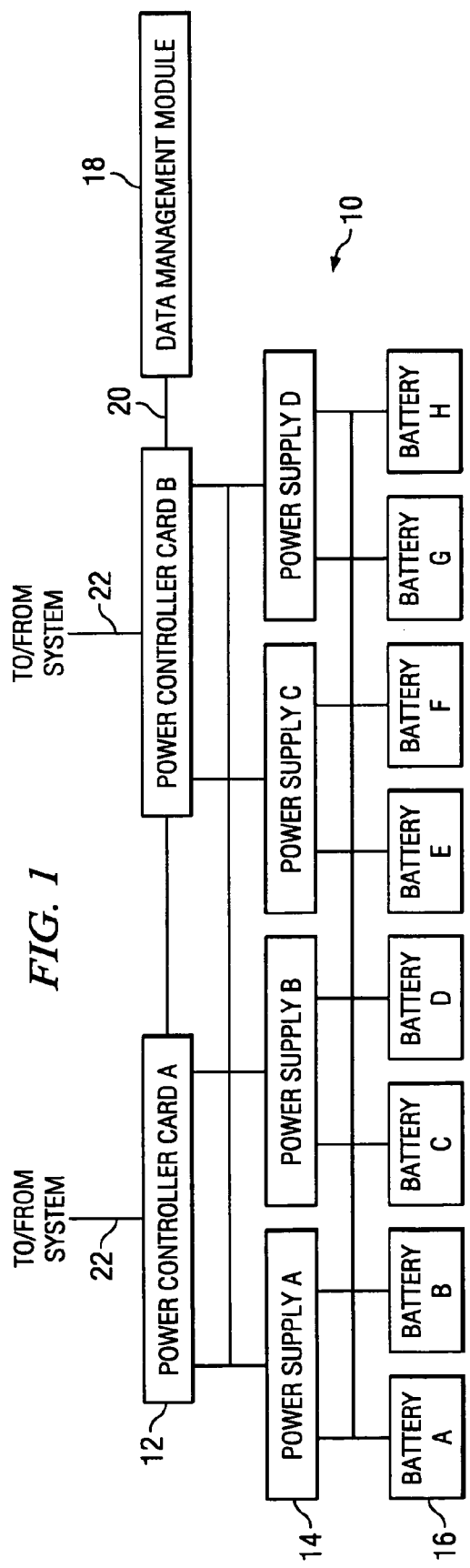
FIG. 1 illustrates an example multipath hierarchical network of redundant devices.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Reference to service may include any conceivable service offering associated with analysis, design, implementation, or utilization of the disclosed apparatus, system, or method. A service may additionally include but is not limited to rental, lease, licensing, and other offering, contractual or otherwise, of hardware, software, firmware, network resources, data storage resources, physical facilities, and the like. Services may additionally include physical labor, consulting, and other offerings of physical, intellectual, and human resources.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Turning to FIG. 1, an example hierarchical network of redundant devices is shown, including an example system for identification, analysis and resolution of mutually exclusive conflicts or other errors seen in the network. Network 10 illustrates a subsystem of power devices in a computer system. The computer system can include such typical components as one or more CPUs, memory, communication, or interface devices and mass storage devices (not shown).

As illustrated, network 10 includes at least two power controller cards 12 (shown as Power Controller Cards A and B). Power controller cards 12 are linked to power supplies 14. Power supplies 14 are located as part of a lower hierarchical level. Linked to power supplies 14 in a still lower hierarchical level are batteries 16. By using a plurality of redundant devices arranged in a hierarchical structure, the computer system can continue to operate and otherwise function if one component of the system were to malfunction. In such a system, multiple pairs/triplets of redundant devices are used to protect against a single point of failure (SPOF).

The various example links depicted in FIG. 1 which connect power controller cards 12 with power supplies 14 and batteries 16 can be intended to provide for the flow of communication between components of network 10. The various example links depicted in FIG. 1 show a multipath hierarchical array. As such, network 10 can have multiple paths from a top-level device to a bottom-level device. The components of network 10 can be connected through such communication protocols as I Squared C ($I^2C$), a RS232-based protocol or similar communications technology. As the computer system and, subsequently, network 10 operates, communications information which can include so-called "status" messages can be sent through the depicted communications channels. Because network 10 is hierarchical in nature, a status message which originates in a lower-level battery 16 is transferred through power supply 14 (battery 16 is said to "report" to power supply 14) and through power controller card 12. For example, communication from Battery G is routed through Power Supply D and then to Power Controller Card B as illustrated. Access to a battery 16 in network 10 is performed indirectly through power controller card 12 and power supply 14. As a result, it is either impractical or impossible to directly communicate with each lower level device in network 10. Instead, power controller card 12 may only access the status of battery 16 as stored on a respective power supply 14. Power controller cards 12 generally cannot interface directly with batteries 16.

Because of indirect peripheral access, a situation can be presented where power controller card 12 receives data from power supply 14 showing a mutually exclusive status for two batteries 16 (e.g., Batteries A and B). Power controller card 12 must decide the cause of the status conflict. In a typical implementation, power controller card 12 is left without enough sufficient information to decide whether blame should be placed on Battery A or Battery B, Power Supply A or Power Supply B, or even another portion of the network 10 fabric. In addition to receiving a status conflict, a status message containing a "can't happen" condition can be received. For example, power controller card 12 may receive status information indicating a bad battery 16. However, network 10 does not have the indicated bad battery installed. Such status information can be identified as "can't happen" error conditions. Again, power controller 12 must determine the cause of the error condition.

To effectively pinpoint which of the plurality of redundant devices is at fault without taking network 10 offline, a system can be implemented which includes a data management module 18. Data management module 18 can be connected to network 10 via a communication link 20. Data management module 18 is a mechanism that, given a particular status combination, returns both "Fault/Not Fault" status and descriptive metadata. The metadata can include information regarding what device, subdevice, network or condition is representing or reflecting the conflict or mutually exclusive condition. The presence of a "Fault/Not Fault" status in combination with the metadata, whether alone at a singular point in time or when combined and aggregated over time and over multiple events, can determine which part of the network 10 is causing the good/not good mutually exclusive condition or other error condition. As a result, a system malfunction is isolated much closer to the actual problem. In addition, the incorporation of a data management module 18 or an equivalent results in less resource impact than current designs which only manage to identify the top-level of a status reporting tree that typically shows error status.

Module 18 can include a logic control entity which can operate alternatively as software, hardware or a combination of software and hardware on the computer system. Module 18 can include such software as a device driver routine or similar software which acts as an interface between applications and hardware devices. Module 18 can be implemented in the computer system as hardware using Very High Speed Integrated Circuit (VHSIC) Hardware Description Language (VHDL). Module 18 can be implemented in the computer system as software which is adapted to operate under a multitasking operating system such as UNIX, LINUX, or an equivalent. Module 18 can be configured to be scalable to operate on an enterprise computer system or incorporate enterprise system communications technology such as ESCON or an equivalent.

Returning to FIG. 1, network 10 includes links 22 which connect power controller cards 12 to/from the overall computer system. While network 10 is illustrated as a three (3) tiered multipath hierarchical network of redundant power devices, network 10 can include a large plurality of tiers arranged in any particular relationship. In addition, while two (2) power controller cards 12, four (4) power supplies 14 and eight (8) batteries 16 are shown, network 10 can include any number of redundant devices in each associated level of the hierarchy as the needs and complexity of the overall computer system requires. While FIG. 1 demonstrates a multipath hierarchy of devices or a multipath hierarchical device tree structure, network 10 can also be seen in a single path tree structure which is less interrelated.

In an example of the operation of network 10 to identify, analyze and resolve mutually exclusive conditions, network 10 is in a typical mode of operation as part of the overall computer system. Power Controller Card B receives status data to indicate an error condition of some sort, e.g., a mutually exclusive or "can't happen" condition, has occurred. The status data is forwarded to data management module 18. Instead of simply taking down a portion or all of network 10 (e.g., Power Controller Card B), data management module 18 generates descriptive metadata which describes the error condition being reported by Power Controller Card B.

By parsing through the generated metadata, module 18 determines that the respective mutually exclusive fault was sourced through both Power Supplies C and D, but ultimately emanates from Battery H. The generated metadata can represent a snapshot of all of the status data that exists in the network at a particular time, for example what data is in the status registers for the power supplies 14 and batteries 16. The metadata can parse through the registers or received status data, in some cases performing bitwise comparisons to determine which of the plurality of redundant devices in network 10 is at fault. In the present example, Module 18 determines that Battery H reports a mutually exclusive condition "good" and "not good." Battery H has sent the bad status to both Power Supplies C and D. The bad status from both Power Supplies C and D has only showed up at one of the power controller cards 12, Power Controller Card B.

Module 18, having analyzed the descriptive metadata to determine that Battery H is the lowest-level potentially failing device in the hierarchy, begins to take action to resolve the error condition. In the present example, logic incorporated into module 18 identifies two possible problems: (1) Battery H is a possible problem device as discussed and (2) Power Controller Card B is also a possible problem device due to the fact that the error condition only registered on one of the two cards 12. Because batteries 16 are generally trivial devices (e.g., the removal of a battery is accomplished with little or no customer impact), it is relatively easy to replace an offending battery 16. As a result, module 18 makes a logical decision to take Battery H offline and suggest replacement of Battery H as a first step.

Figure 2:
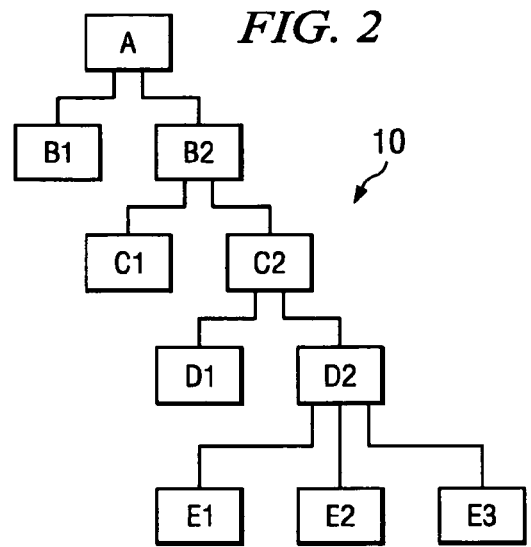
FIG. 2 illustrates a portion of a hierarchical network of redundant devices in a separate example.

Turning to FIG. 2, a portion of network 10 is depicted in an expanded example. Letters A-E represent various hierarchical levels as part of network 10. Again, network 10 can have additional levels and/or numbers of redundant devices. In an example of operation of the depicted portion of network 10, device A passes in a copy of status data from devices B1 and B2 to the data management module 18. The module 18 traverses all the status data received from both, and determines that device B2 status has an error condition such as a mutually exclusive conflict. Methods previous to the instant example typically stop and call out device B2 as the likely cause of the conflict. Device B2 would be taken offline and a custom engineer would perform offline isolation and diagnostics to identify if that device or another device should be swapped.

In contrast to prior art, the instant example does not stop at the identification of device B2. Module 18 then checks the data in device B2 that represents both C1 and C2 devices to see if the mutually exclusive conflict was in the B2 status representing one or both of devices C1 and C2. Assuming that both devices C1 and C2 show a conflict, the method continues by searching devices D1 and D2 status data in both devices C1 and C2. The method then determines that only device D2 generated status data shows a conflict in both devices C1 and C2.

Finally, the method looks inside the device D2 status data to see if devices E1, E2 and/or E3 are generating a conflict. Assuming that devices E1, E2 and E3 do not show a conflict, the method has determined the following: (1) a disagreement is present between devices B1 and B2, (2) device B2 has identified conflict issues in both devices C1 and C2, so neither C device is a likely cause, (3) device D2 is showing conflict to both devices C1 and C2, but the conflict is not due to a problem with devices E1, E2 or E3, and (4) the most likely sources for the problem in the example method are devices B2 and D2. As a result of executing the example method, module 18 then returns metadata indicating that devices B2 and D2 are the likely problems. A calling function associated with module 18 can then open a window or begin to threshold failures for each of devices B2 and D2.

Figure 3:
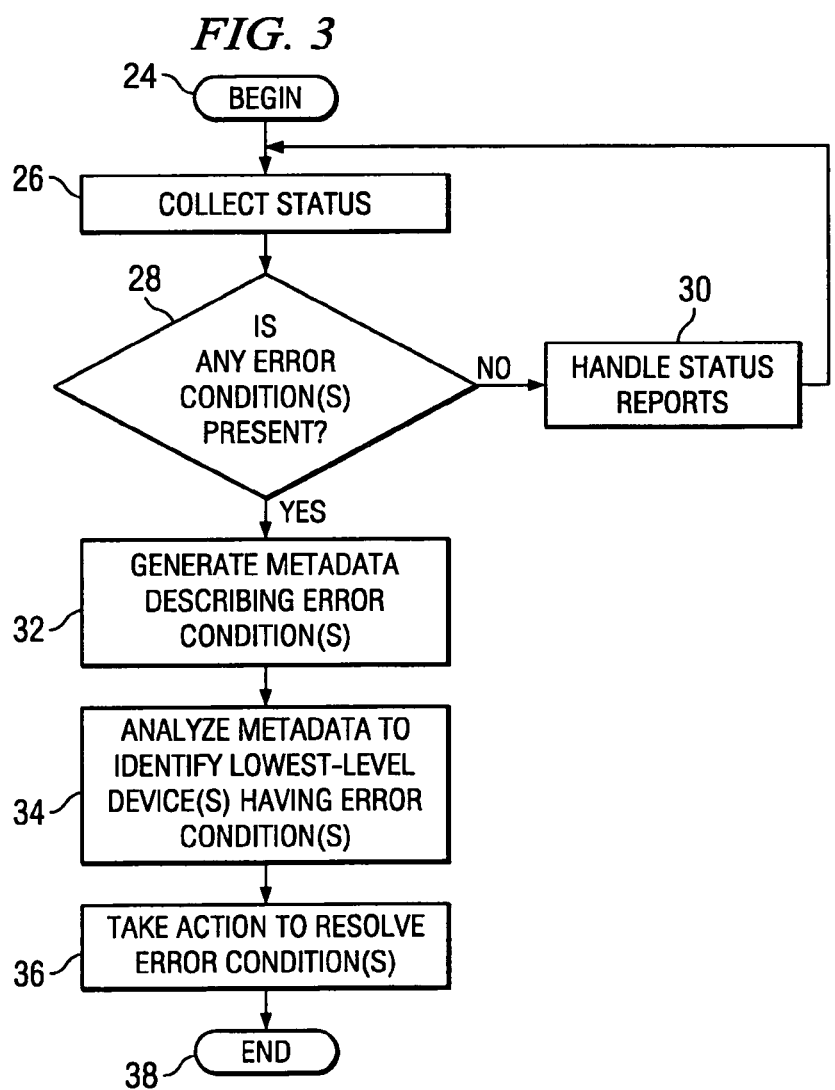
FIG. 3 illustrates an example flowchart of analyzing and resolving a mutually exclusive condition in a hierarchical network of redundant devices.

Turning to FIG. 3, a method of identifying, analyzing and resolving error conditions in a hierarchical network of redundant devices is shown. Step 24 begins the example method. The system, including module 18 either individually or in combination with other components in the computer system, collects status data from the network of redundant devices as previously described in step 26. Collecting status step 26 can include target driven status activity where the network 10 sends up a collection of data. Collecting step 26 can also involve polling activity where a top-level device or network of devices instructs the lower-level network 10 to send any and all status data at a particular interval of time. Step 26 ultimately becomes implementation specific depending on the structure and complexity of the associated computer system.

Step 28 identifies any error conditions in network 10 by parsing through the received status data or similar. Additionally, step 28 queries whether any error conditions are present. If the result is negative, the system moves to step 30 to handle status reports to address such needs as what the system needs to log or what indicator lights need to be lit. After a particular time or the completion of a set of designated tasks identified in the status reports, the system again returns to collect status step 26.

If the result of the system's query whether an error condition exists is positive, the system then moves to step 32 and generates metadata which describes the error conditions as previously discussed. Once respective metadata is generated in step 32, the system then moves to analyze the metadata to identify likely failing devices in step 34. Instead of stopping at the first redundant device that shows conflict, the system continues to tunnel to a lower level in the hierarchy to determine the lowest level device(s) responsible for the error conditions, again as previously described.

Step 36 then involves the system taking action in some manner to resolve the error conditions. The action taken can be specifically against a potentially failing device, such as a discrete command to take a device offline. Additionally, the action can be an asynchronous action to identify the device to be swapped out at a later time or to make a note in an internal system register denoting that the device in question is possibly bad and to continue to monitor the problem device.

Although the instant example can relate specifically to mutually exclusive error conditions, the same method and procedure is applicable to detecting and resolving other error conditions seen in network 10, such as the previously described "can't happen" condition. In the case of a "can't happen" condition, data management module 18 makes a determination as to which lowest-level or most minor (least impacting) device is responsible for the "can't happen" condition. Again, action is taken against the offending device to resolve the error condition.

The described method of analysis and resolution of mutually exclusive conditions can be extended to such topologies as a computer network of redundant devices including a subnet or switch system. The computer network can include top-level routers with routers lying in a lower level of the hierarchy. The system in such a topology can follow a similar method as previously described. The take action step 36 can include such activities as posting a light or sending an event to a network technician notifying the technician of the problem.

While one or more embodiments of the present invention have been illustrated in detail, the skilled artisan will appreciate that modifications and adaptations to those embodiments may be made without departing from the scope of the present invention as set forth in the following claims.

What is claimed is:

1. A system for analyzing mutually exclusive conflicts among a plurality of redundant power devices arranged in a hierarchical structure in a computer systems, wherein the plurality of redundant power devices includes a plurality of power controller cards at a first hierarchical level, linked to a plurality of power supplies at a second hierarchical level, where each power supply includes a plurality of batteries at a third hierarchical level, the system comprising:
    a data management module operable on the computer system, wherein the data management module
        parses through status data generated by the plurality of redundant power devices to identify an error condition in one of the plurality of redundant devices,
        generates metadata describing the error condition, and
        takes action to resolve the error condition
        wherein the status data comprises an indication that one of said plurality of batteries is bad, when in fact the plurality of redundant power devices does not include a bad battery.

2. The system of claim 1, wherein the metadata further includes information which identifies a lowest-level device among the plurality of redundant devices.

3. The system of claim 1, wherein the data management module further comprises a logic control entity operating alternatively as software, hardware or a combination of software and hardware on the computer system.

4. The system of claim 3, wherein the data management module further comprises a device driver routine.

5. The system of claim 4, wherein the device driver routine is implemented in the computer system as hardware using Very High Speed Integrated Circuit (VHSIC) Hardware Description Language (VHDL).

6. The system of claim 4, wherein the device driver routine is implemented as software operable under a multitasking operating system.

7. A method of analyzing mutually exclusive conflicts among redundant power devices arranged in a hierarchical structure in a computer system, wherein the plurality of redundant power devices includes a plurality of power controller cards at a first hierarchical level, linked to a plurality of power supplies at a second hierarchical level, where each power supply includes a plurality of batteries at a third hierarchical level, the method comprising:
    collecting status data from the redundant power devices;
    identifying an error condition;
    generating metadata describing the error condition;
    analyzing the metadata to determine a redundant device responsible for the error condition; and
    taking an action to resolve the error condition
    wherein the status data comprises an indication that one of said plurality of batteries is bad, when in fact the plurality of redundant power devices does not include a bad battery.

8. The method of claim 7, wherein the metadata further includes information which identifies a lowest-level device among the redundant devices.

9. The method of claim 7, wherein collecting status data is performed by a data management module adapted to be operable on the computer system.

10. The method of claim 9, wherein the data management module is implemented as a logic control entity operating alternatively as software, hardware or a combination of software and hardware on the computer system.

11. The method of claim 10, wherein the data management module further comprises a device driver routine.

12. The method of claim 11, wherein the device driver routine is implemented in the computer system as hardware using Very High Speed Integrated Circuit (VHSIC) Hardware Description Language (VHDL).

13. The method of claim 11, wherein the device driver routine is implemented as software adapted to operate under a multitasking operating system.

14. A computer readable medium storing a computer program product for analyzing mutually exclusive conflicts among a plurality of redundant power devices arranged in a hierarchical structure, wherein the plurality of redundant power devices includes a plurality of power controller cards at a first hierarchical level, linked to a plurality of power supplies at a second hierarchical level, where each power supply includes a plurality of batteries at a third hierarchical level, comprising:

computer readable program code which collects status data from the redundant power devices;
computer readable program code which identifies an error condition; computer
readable program code which generates metadata describing the error condition;
computer readable program code which analyzes the metadata to determine a device among the plurality of redundant devices responsible for the error condition; and
computer readable program code which takes an action against the device to resolve the error condition
wherein the status data comprises an indication that one of said plurality of batteries is bad, when in fact the plurality of redundant power devices does not include a bad battery.

15. The computer readable medium of claim 14, wherein the metadata further includes information which identifies a lowest-level device among the plurality of redundant devices.

16. The computer readable medium of claim 14, wherein the computer program code which collects status data is implemented as a portion of a device driver routine.

17. The computer readable medium of claim 14, wherein the device driver routine is adapted to operate under a multitasking operating system.

18. The system of claim 1, wherein the status data further comprises an indication of a "can't happen" condition.

19. The method of claim 7, wherein the status data further comprises an indication of a "can't happen" condition.

20. The computer program product of claim 14, wherein the status data further comprises an indication of a "can't happen" condition.

* * * * *

UNITED STATES PATENT AND TRADEMARK OFFICE
CERTIFICATE OF CORRECTION

PATENT NO. : 7,607,043 B2
APPLICATION NO. : 11/324849
DATED : October 20, 2009
INVENTOR(S) : Crawford et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 570 days.

Signed and Sealed this

Twelfth Day of October, 2010

David J. Kappos
*Director of the United States Patent and Trademark Office*